US012681583B2

(12) United States Patent
Fujita et al.

(10) Patent No.: US 12,681,583 B2
(45) Date of Patent: Jul. 14, 2026

(54) INFORMATION PROCESSING DEVICE, INFORMATION PROCESSING SYSTEM, STORAGE MEDIUM STORING INFORMATION PROCESSING PROGRAM, AND INFORMATION PROCESSING METHOD

(71) Applicant: CANON KABUSHIKI KAISHA, Tokyo (JP)

(72) Inventors: Shunji Fujita, Kanagawa (JP); Kenichiro Tomita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/247,993

(22) Filed: Jun. 24, 2025

(65) Prior Publication Data
US 2026/0003436 A1     Jan. 1, 2026

(30) Foreign Application Priority Data
Jun. 26, 2024     (JP) ................................. 2024-103357

(51) Int. Cl.
*G06F 3/01*          (2006.01)
(52) U.S. Cl.
CPC .................................... *G06F 3/016* (2013.01)
(58) Field of Classification Search
CPC ...................................................... G06F 3/016
See application file for complete search history.

(56) References Cited

U.S. PATENT DOCUMENTS

| | | | | |
|---|---|---|---|---|
| 10,359,855 B1 * | 7/2019 | Vonikakis | ................ | G08B 5/36 |
| 2007/0247393 A1 * | 10/2007 | Kuroki | .................... | G06F 3/016 |
| | | | | 345/8 |
| 2007/0290988 A1 * | 12/2007 | Nogami | .................. | G06F 3/016 |
| | | | | 345/156 |
| 2008/0059131 A1 * | 3/2008 | Tokita | .................... | G06F 3/011 |
| | | | | 703/5 |
| 2011/0021272 A1 * | 1/2011 | Grant | ...................... | A63F 13/10 |
| | | | | 463/30 |
| 2013/0169423 A1 * | 7/2013 | Iorgulescu | ............. | A61B 34/76 |
| | | | | 340/407.1 |
| 2019/0201785 A1 * | 7/2019 | Heubel | .................. | G06F 3/016 |
| 2021/0117002 A1 * | 4/2021 | Eagleman | ............... | G06F 3/011 |

(Continued)

FOREIGN PATENT DOCUMENTS

| | | |
|---|---|---|
| JP | H09330016 A | 12/1997 |
| JP | 2018142374 A | 9/2018 |
| JP | 2024030386 A | 3/2024 |

*Primary Examiner* — Ariel A Balaoing
(74) *Attorney, Agent, or Firm* — Canon U.S.A., Inc. IP Division

(57)          ABSTRACT

An information processing device includes a processor, and a memory storing a program which, when executed by the processor, causes the information processing device to execute acquisition processing to acquire information about a physical characteristic of a virtual object, execute setting processing to set a first region and a second region different from the first region in a space where the virtual object is located, and execute control processing to, in a case where a position of the virtual object held by a user falls within the first region in the space, not control generation of a haptic effect based on the information, and in a case where the position falls within the second region, control the genera-tion of the haptic effect.

20 Claims, 10 Drawing Sheets

(56) References Cited

U.S. PATENT DOCUMENTS

| | | | |
|---|---|---|---|
| 2023/0036123 A1* | 2/2023 | Long | G06F 3/016 |
| 2023/0121539 A1* | 4/2023 | Gupta | G09B 21/006 |
| 2024/0028129 A1* | 1/2024 | Whitmire | G06F 3/011 |

* cited by examiner

FIG.5A
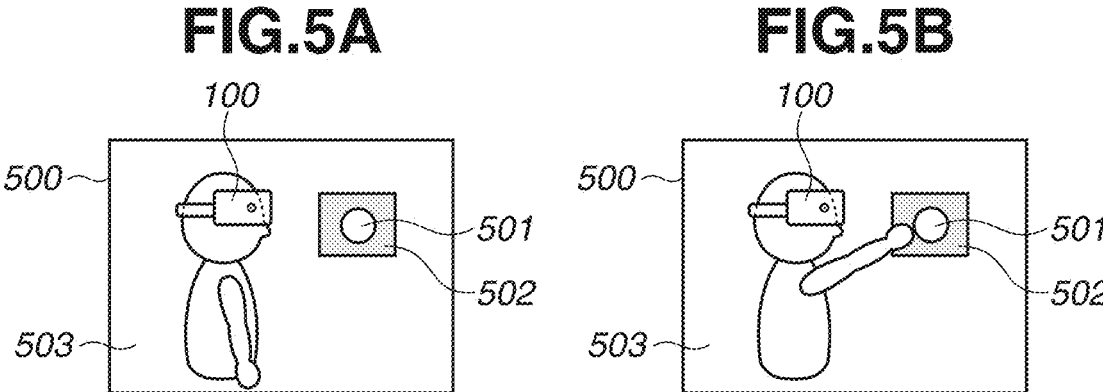
FIG.5B
FIG.5C
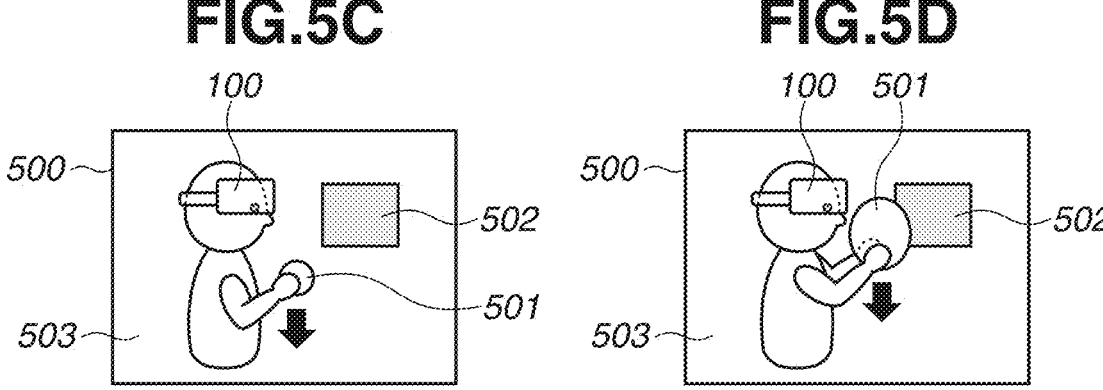
FIG.5D
FIG.5E
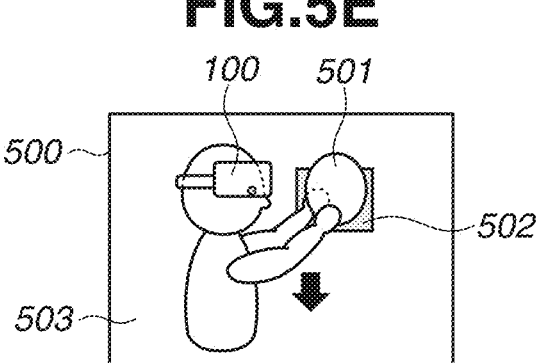

FIG.9A
FIG.9B
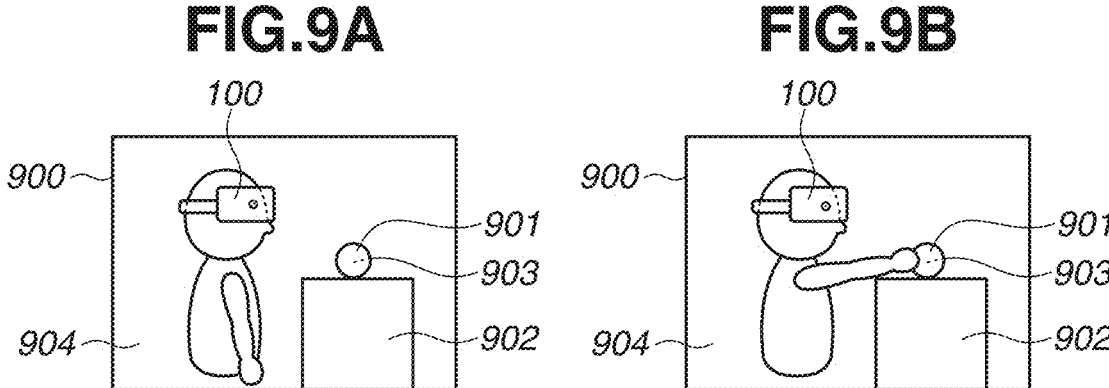
FIG.9C
FIG.9D
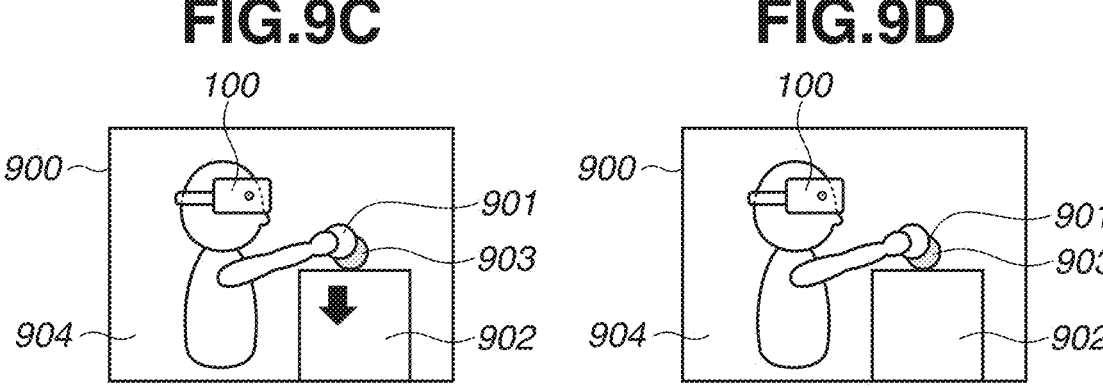
FIG.9E
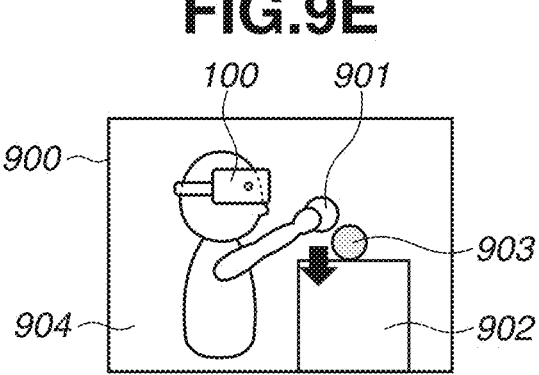

INFORMATION PROCESSING DEVICE, INFORMATION PROCESSING SYSTEM, STORAGE MEDIUM STORING INFORMATION PROCESSING PROGRAM, AND INFORMATION PROCESSING METHOD

BACKGROUND OF THE DISCLOSURE

Field of the Disclosure

The present disclosure relates to an information processing device that presents haptic sensation to a user in a virtual space or a mixed reality space.

Description of the Related Art

Cross reality (XR) systems that enable users using head-mounted displays (HMDs) to experience virtual reality have heretofore been discussed. One of the means for providing tactile or weight sensation when touching an object in such virtual reality environments is haptic technology. For example, Japanese Patent Application Laid-Open No. 2018-142374 discusses a technique that provides special vibrational stimuli to trick the brain into feeling as if the user is touching a virtual object. In other words, Japanese Patent Application Laid-Open No. 2018-142374 discusses a technique for presenting such haptic sensation.

Suppose that haptic sensation such as weight is presented in response to the user's operation on a virtual object like gripping (grasping) and releasing. In such a case, if the haptic sensation is provided in a state where the user's posture is not yet stable, the user may be startled depending on the type and magnitude (strength) of the haptic sensation presented. This can lead to a drop in operability.

SUMMARY OF THE DISCLOSURE

The present disclosure is directed to performing haptic feedback control with high user operability when a user operates a virtual object.

According to an aspect of the present disclosure, an information processing device includes a processor, and a memory storing a program which, when executed by the processor, causes the information processing device to execute acquisition processing to acquire information about a physical characteristic of a virtual object, execute setting processing to set a first region and a second region different from the first region in a space where the virtual object is located, and execute control processing to, in a case where a position of the virtual object held by a user falls within the first region in the space, not control generation of a haptic effect based on the information, and in a case where the position falls within the second region, control the generation of the haptic effect.

Further features of the present disclosure will become apparent from the following description of exemplary embodiments with reference to the attached drawings.

BRIEF DESCRIPTION OF THE DRAWINGS

FIG. 5A is a diagram for describing a scene where a user wearing the HMD and a virtual are present in a mixed reality space according to one or more aspects of the present disclosure. FIG. 5B is a diagram for describing a scene according to one or more aspects of the present disclosure, where the user is gripping the virtual object with one hand and haptics are disabled because the gripping position falls within the haptics-disabled region. FIG. 5C is a diagram for describing a scene according to one or more aspects of the present disclosure, where the user is gripping the virtual object with one hand and haptics are enabled because the gripping position falls within the haptics-enabled region. FIG. 5D is a diagram for describing a scene according to one or more aspects of the present disclosure, where the user is gripping the virtual object with both hands and haptics are enabled since both the gripping positions fall within the haptics-enabled region. FIG. 5E is a diagram for describing a scene according to one or more aspects of the present disclosure, where the user is gripping the virtual object with both hands and haptics are disabled because one of the gripping positions falls within the haptics-disabled region.

FIG. 9A is a diagram for describing a scene where a user wearing an HMD and a virtual object are present in a mixed reality space according to one or more aspects of the present disclosure. FIG. 9B is a diagram for describing a scene where the user wearing the HMD in the mixed reality space according to one or more aspects of the present disclosure grips the virtual object. FIG. 9C is a diagram for describing a scene where a part of the gripped virtual object enters a haptics-enabled region according to one or more aspects of the present disclosure. FIG. 9D is a diagram for describing a scene where the user wearing the HMD in the mixed reality space according to one or more aspects of the present disclosure is gripping and lifting up the virtual object. FIG. 9E is a diagram for describing a scene where the user wearing the HMD in the mixed reality space according to one or more aspects of the present disclosure is gripping and lifting up the virtual object.

DESCRIPTION OF THE EMBODIMENTS

Figure 1:
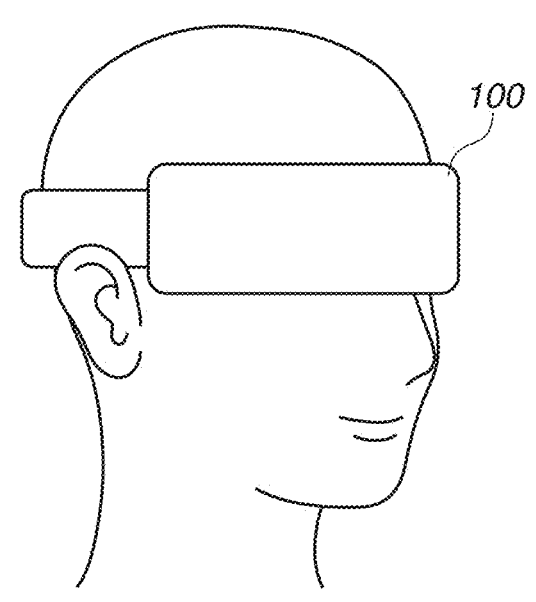
FIG. 1 is a diagram for describing an information processing system according to one or more aspects of the present disclosure.
Figure 1:
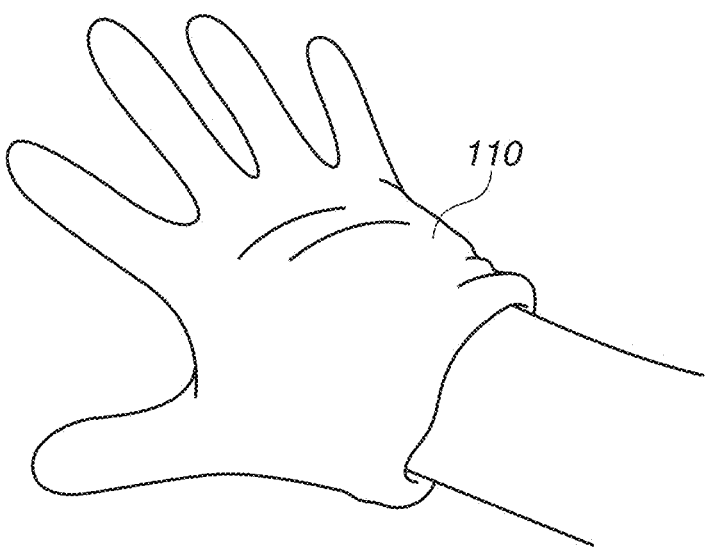

Exemplary embodiments will be described below with reference to the drawings. The same or similar components, members, and processing illustrated in the drawings are denoted by the same reference numerals, and a redundant description thereof will be omitted. In the drawings, part of the components, members, and processing may be illustrated in a simplified form.

System Configuration

A configuration of an information processing system according to a first exemplary embodiment will be described with reference to FIG. 1. The information processing system includes a head-mounted display (HMD) 100 and user assist devices 110.

The HMD 100 is a display device (electronic equipment) of head-mounted type that can be worn on a user's head. The HMD 100 includes cameras for capturing images in front of the user, and a display for displaying images to the user. The HMD 100 displays combined images obtained by combining the images captured by the cameras with a virtual object that is computer graphics (CG) content on the display. This enables the user to experience virtual reality with their own eyes. The HMD 100 also has a function of detecting the user's hands from the captured images, acquiring information about the positions and orientations of the hands, and applying the hand movements to interact with the virtual object. This enables the user to intuitively operate the virtual object with their hands.

The user assist devices 110 are devices for presenting haptics instructed by the HMD 100 to the user. In the first exemplary embodiment, the user assist devices 110 will be described to have a glove shape, whereas the user assist devices 110 may have a bracelet shape or ring shape. The user assist devices 110 may be configured as controllers for the user to grip.

Internal Configuration of HMD

Figure 2A:
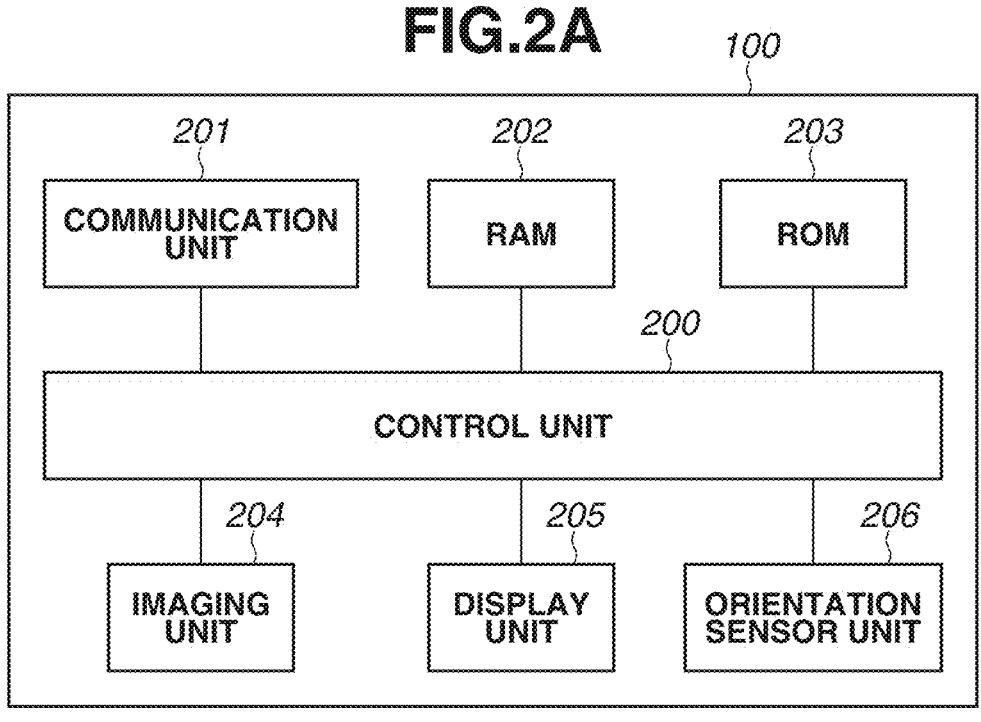
FIG. 2A is a diagram for describing an internal configuration of a head-mounted display (HMD) according to the first exemplary embodiment.

An internal configuration of the HMD 100 will be described with reference to FIG. 2A. The HMD 100 includes a control unit 200, a communication unit 201, a random access memory (RAM) 202, a read-only memory (ROM) 203, an imaging unit 204, a display unit 205, and an orientation sensor unit 206.

The control unit 200 controls the components of the HMD 100. The control unit 200 executes programs stored in the ROM 203 and controls the processing units of the entire HMD 100 using the RAM 202 as a work area. For example, the control unit 200 includes one or more processors such as a central processing unit (CPU) and a graphics processing unit (GPU). Instead of the control unit 200 controlling the entire device, a plurality of pieces of hardware may control the entire device by sharing processing. The control unit 200 receives images (captured images) acquired by the imaging unit 204 and orientation information acquired by the orientation sensor unit 206. The control unit 200 performs image processing for cancelling aberrations occurring in the optical systems of the imaging unit 204 and the display unit 205 on the captured images. The control unit 200 then combines the captured images with given CG to generate combined images, and controls the display unit 205 to display the combined images. The control unit 200 also acquires coordinates of the HMD 100 in real space based on the captured images acquired from the imaging unit 204. Such presentation of combined images obtained by superimposing CG on the images of real space to the user is referred to as mixed reality (MR). An MR space is generated by acquiring information about the positions, directions, and depths of real objects in real space based on the captured images of real space and other sensors, and arranging the real objects and virtual objects in the space. Displaying the MR space to the user enables the user to perceive the virtual objects as if they exist in real space. In other words, this can express a space where real space and a virtual space are mixed, and the user can experience the space as if they exist in that space. Using the MR space, information about a virtual world and the real world can be simultaneously provided to the user. This enables the user to have virtual experience in real space or engage in realistic communication with people in real space through the virtual space at a remote location.

The control unit 200 may acquire the coordinates of the HMD 100 in real space based on the captured images acquired by the imaging unit 204 and the information (position information and orientation information) acquired by the orientation sensor unit 206.

The control unit 200 estimates the positions or orientations of the joint points of the user's hands and fingers from two camera images obtained by the imaging unit 204. The joint points include characteristic points of parts such as finger joints, fingertips, the backs of the hands (palms), and arms. Each joint point represents a coordinate position, and orientation can be estimated from information about a plurality of joint points. Examples of the method for estimating the positions or orientations of the hands and the hands' joint points include conventional machine learning-based object recognition and posture estimation techniques using a convolutional neural network. Position information about the hands' joint points in the depth direction can be obtained, for example, by calculating distances from the imaging unit 204 to the respective joint points through stereo matching-based triangulation using the two camera images obtained by the imaging unit 204.

The control unit 200 controls the position, orientation, and size of CG in the combined images based on the information (position information and orientation information) acquired by the orientation sensor unit 206. Suppose, for example, that a virtual object represented by CG is placed in the space expressed by the combined images, near a specific object that is present in real space. In such a case, the control unit 200 makes the virtual object (CG) greater in size the closer the distance between the specific object and the imaging unit 204. By controlling the position, orientation, and size of the CG in such a manner, the control unit 200 can generate combined images where the CG object not placed in real space appears as if placed in real space.

The communication unit 201 performs Bluetooth® wireless communication with the user assist devices 110 (communication units 211). The communication unit 201 may performed Wireless Fidelity (Wi-Fi) (registered trademark) wireless communication.

The RAM 202 is a temporary storage area such as a main memory and a work area of the HMD 100. The RAM 202 stores a haptics-enabled region and a haptics-disabled region determined based on the flowchart of FIG. 3 and a haptic parameter amount determined based on the flowchart of FIG. 4. The RAM 202 is also used as a buffer memory for temporarily storing image data captured by the imaging unit 204, an image display memory for the display unit 205, and a work area of the control unit 200.

The ROM 203 is an electrically erasable and recordable nonvolatile memory. The ROM 203 stores control programs to be executed by the control unit 200 and mass information about virtual objects.

The imaging unit 204 includes two cameras (imaging devices). To capture images of a space similar to that which the user normally views, the two cameras are located near the positions of the user's left and right eyes when wearing the HMD 100. The images (captured images) of objects (in front of the user) captured by the two cameras are output to the RAM 203. The two cameras of the imaging unit 204 can also acquire information about distance from the two cameras to the objects as distance information through stereo camera ranging. The number of cameras is not limited to two, and more cameras may be included.

The display unit 205 is a display for displaying the combined images of the captured images and virtual objects, and operation menus for performing various types of control on the HMD 100, as a three-dimensional image. For example, the display unit 205 includes liquid crystal panels or organic electroluminescence (EL) panels. When the user is wearing the HMD 100, the liquid crystal panels or organic EL panels are located in front of the respective eyes of the user.

Devices using semitransparent half mirrors may be used for the display unit 205. In such a case, for example, the display unit 205 may display images so that virtual objects appear directly superimposed on real space seen through the half mirrors, using techniques typically called augmented reality (AR). Alternatively, the display unit 205 may display images of a fully virtual space using techniques typically called virtual reality (VR), without using captured images. The virtual space is a space set up based on real space, and real space is not visible to the user on the display unit 205. In other words, the display unit 205 usually displays the images of the virtual space, and does not display the captured images while the user experiences the virtual space. This makes the user feel like the virtual space spreads out in their field of view instead of real space, and allows for a perception that the user is present in the virtual space.

The orientation sensor unit 206 acquires orientation (and position) information about the HMD 100. The orientation sensor unit 206 then acquires orientation information about the user (user wearing the HMD 100) corresponding to the orientation (and position) of the HMD 100. The orientation sensor unit 206 includes an inertial measurement unit (IMU) including an acceleration sensor, an angular velocity sensor, and a geomagnetic sensor. The orientation sensor unit 206 is used in acquiring the information about the orientation of the user (orientation information). The control unit 200 controls the orientation sensor unit 206 to acquire the information about the orientation of the user (orientation information).

While the HMD 100 is described here as an example of a display device of head-mounted type with a built-in information processing device, the information processing device is not limited thereto. The information processing device may be a smartphone, a tablet terminal, or a personal computer (PC) wired or wirelessly connected to a display device of head-mounted type. In such a case, part of the foregoing processing of the HMD 100 may be performed by the information processing device wired or wirelessly connected to the display device of head-mounted type.

Internal Configuration of User Assist Devices

Figure 2B:
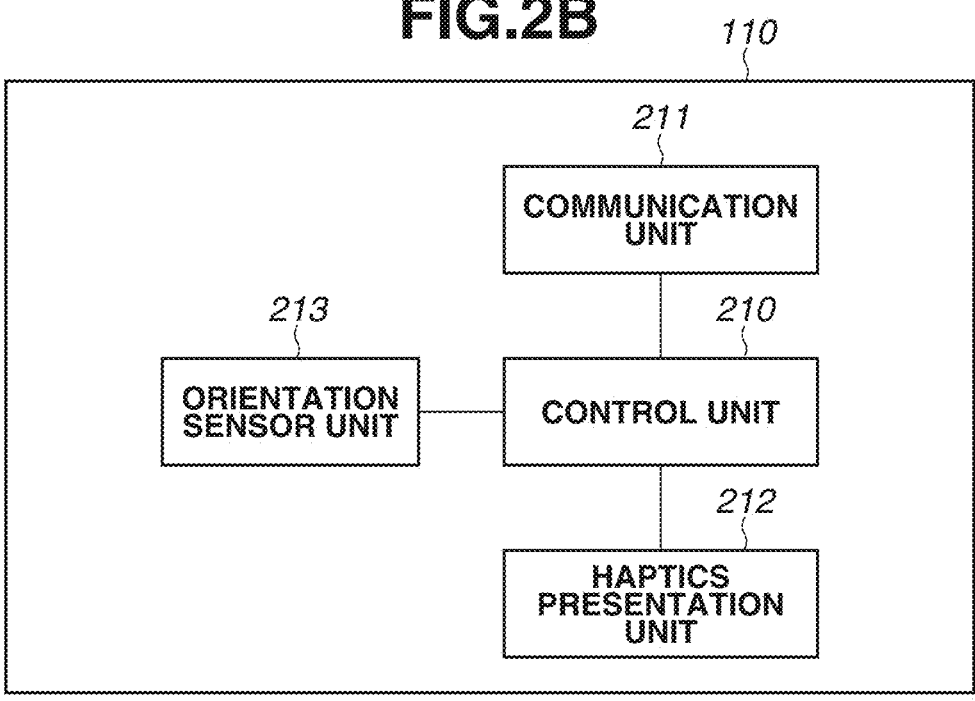
FIG. 2B is a diagram for describing an internal configuration of a user assist device according to one or more aspects of the present disclosure.

An internal configuration of the user assist devices 110 will be described with reference to FIG. 2B.

Each user assist device 110 includes a control unit 210, a communication unit 211, a haptics presentation unit 212, and an orientation sensor unit 213.

The control unit 210 controls the components of the user assist device 110. The control unit 210 controls the haptics presentation unit 212 based on a haptic parameter acquired from the HMD 100 via the communication unit 211.

The communication unit 211 performs Bluetooth® wireless communication with the HMD 100 (communication unit 201). The communication unit 211 may perform Wi-Fi wireless communication.

The haptics presentation unit 212 includes an actuator for presenting haptic information, and presents desired sensations of force, object, weight, movement, and shape change to the user based on the acquired haptic parameter.

The haptic feedback is not limited to a haptic sensation of mass, and haptic effects based on information about physical characteristics of the virtual object may be presented. The physical characteristics may include at least one of the size, shape, rigidity, weight, thermal characteristics, and texture of the virtual object.

The orientation sensor unit 213 acquires orientation (and position) information about the user assist device 110. The orientation sensor unit 213 includes an IMU including an acceleration sensor, an angular velocity sensor, and a geomagnetic sensor. The control unit 210 acquires the orientation (and position) information about the user assist device 110, and controls transmission of the orientation (and position) information to the control unit 200 via the communication unit 211. The user assist device 110 does not need to include the orientation sensor unit 213, in which case the control unit 200 of the HMD 100 acquires (estimates) the orientation (and position) information about the user assist device 110 based on the images captured by the imaging unit 204.

Figure 3:
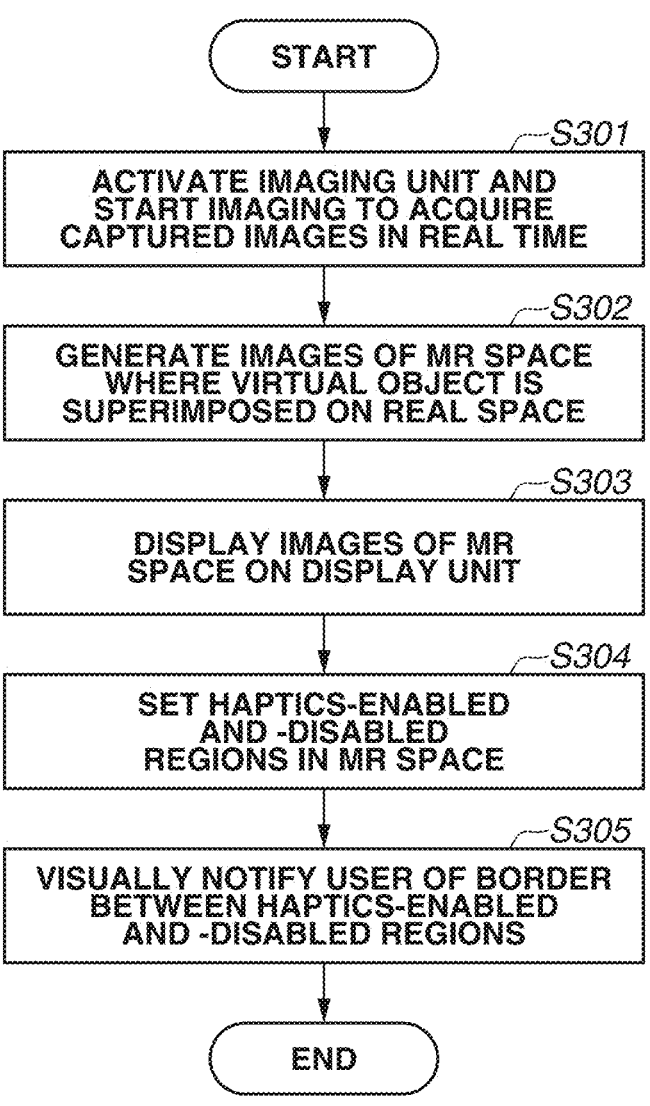
FIG. 3 is a flowchart for describing a processing procedure for determining a haptics-enabled region and a haptics-disabled region according to one or more aspects of the present disclosure.

Processing for Determining Haptics-Disabled Region and Haptics-Enabled Region Processing for determining a haptics-disabled region and a haptics-enabled region according to the first exemplary embodiment of the present disclosure will be described with reference to the flowchart of FIG. 3. The haptics-disabled region refers to a region such that control to provide the user with haptic sensation as if there is a weight is not performed when the user assist device 110 is located therein. The haptics-disabled region is an example of a first region according to the present disclosure. The haptics-enabled region refers to a region such that the control to provide the user with haptic sensation as if there is a weight is performed when the user assist device 110 is located therein. The haptics-enabled region is an example of a second region according to the present disclosure. This flowchart is started when a virtual object is displayed in the MR space, and is executed at least for the first time. The timing to execute this flowchart is not limited to when a virtual object is displayed in the MR space. For example, the timing may be when the user activates the HMD 100, or when the user activates an HMD application. The following flowchart may be executed when a mode for providing haptic feedback is selected. The following flowchart may be executed in response to the user making a resetting operation at predetermined timing. The following flowchart may be executed not only before a virtual object is placed, but also after a virtual object is placed. If the following flowchart is executed before a virtual object is placed, the virtual object can be located based on the set haptics-enabled and -disabled regions. If the following flowchart is executed after a virtual object is placed, the haptics-enabled and -disabled regions can be set based on the location of the virtual object.

In step S301, the control unit 200 activates the imaging unit 204 and starts capturing images of the surrounding real space to acquire captured images in real time. The processing proceeds to step S302. If the HMD 100 has already been activated and the imaging by the imaging unit 204 has been started, step S301 may be skipped.

In step S302, the control unit 200 generates images of the MR space where the virtual object is superimposed on real space (real images). The processing proceeds to step S303. In the case of providing haptic feedback of a virtual object displayed in a virtual space, images where the virtual object is located in the virtual space may be generated based on the images of real space acquired by the imaging unit 204.

In step S303, the control unit 200 displays the images of the MR space on the display unit 205. The processing proceeds to step S304. In the case of displaying the virtual object in the virtual space, the images of the virtual space may be displayed on the display unit 205.

Figure 6A:
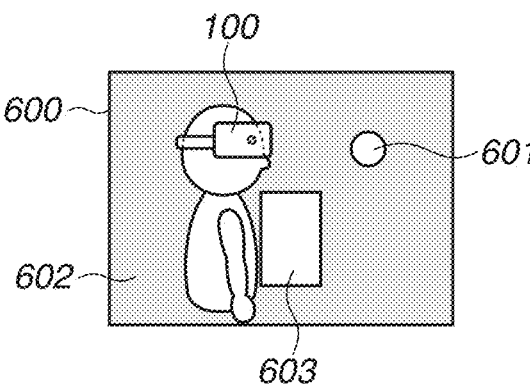
FIG. 6A is a diagram for describing a scene where the user wearing the HMD and a virtual object are present in a mixed reality space according to one or more aspects of the present disclosure.

In step S304, the control unit 200 determines the haptics-enabled region and the haptics-disabled region. FIGS. 5A and 6A illustrate examples of determination of the haptics-enabled and -disabled regions. FIG. 5A is a diagram for describing a scene where the user wearing the HMD 100 and a virtual object 501 are present in an MR space 500. Here, with reference to the coordinates of the virtual object 501, a surrounding region 502 is determined to be a haptics-disabled region 502. A region 503 obtained by excluding the haptics-disabled region 502 from the MR space 500 is determined to be a haptics-enabled region 503. In the case of a virtual space, the user illustrated in FIGS. 5A and 6A may be an avatar in the virtual space.

FIG. 6A is a diagram for describing a scene where the user wearing the HMD 100 and a virtual object 601 are present in an MR space 600. Here, with reference to the position of the HMD 100, a specific region 603 in front of the user is assumed as a region where the user checks the weight of the virtual object 601 with their hands, and determined to be a haptics-enabled region 603. A region 602 obtained by excluding the haptics-enabled region 603 from the MR space 600 is determined to be a haptics-disabled region 602.

A haptics-enabled region may be a region within a predetermined distance from the user's torso, or a region within a predetermined distance from a portion of the user's body part. A haptics-enabled region may be moved to follow the movement of the user (HMD 100). If the haptics-enabled region is a predetermined region from the user's torso, the user checks the weight with their hands closer to the torso. This enables the user to check the weight in a state more stable than with the hands farther from the torso.

If the virtual object is located in an MR space, the control unit 200 may set the haptics-enabled and -disabled regions based on the positions of real objects.

Alternatively, the control unit 200 may set the haptics-enabled and -disabled regions based on the positions of virtual objects located in a virtual space. The virtual objects to serve as a positional reference in setting the haptics-enabled and -disabled regions may be ones capable of user interaction such as gripping, or ones not capable of interaction.

The haptics-enabled and -disabled regions may be set based on the user's operation. For example, the user may draw the border between the regions by manually drawing a line. The border between the regions may be drawn based on the position or orientation of a controller.

The virtual object may be placed before the haptics-enabled and -disabled regions are set to user-desired areas, for example. Alternatively, the haptics-enabled and -disabled regions may be set to user-desired areas based on the location of the user, and then the virtual object may be placed based on the set haptics-enabled and -disabled regions.

In step S305, the control unit 200 performs display control so that the haptics-enabled and -disabled regions set in step S304 can be visually identified. In other words, the control unit 200 visually notifies the user of the border between the haptics-enabled and -disabled regions via the display unit 205. Note that the processing of step S305 may be omitted. Only one of the haptics-enabled and -disabled regions may be visually displayed.

The setting of the haptics-enabled and -disabled regions is not limited to an MR space. The haptics-enabled and -disabled regions may be set in a virtual (VR) space or an AR space. When switching screens from an MR space to a virtual (VR) space, the haptics-enabled and -disabled regions set in the MR space may be inherited.

In such a manner, the user can make preparations for haptic feedback by setting the haptics-enabled and -disabled regions based on the flowchart.

Processing for Determining Haptic Parameter Based on Position Where Virtual Object is Gripped Processing for determining the haptic parameter based on the position where the virtual object is gripped according to the first exemplary embodiment of the present disclosure will be described with reference to the flowchart of FIG. 4. This flowchart demonstrates control means according to the present disclosure. This flowchart is started when a virtual object is displayed in the MR space, and repeatedly executed at regular periodic intervals, such as several tens of milliseconds or so, while the virtual object is displayed. The user can receive haptic feedback through the execution of this flowchart.

In step S401, the control unit 200 acquires captured images in real time. The processing proceeds to step S402.

In step S402, the control unit 200 generates images of the MR space where the virtual object is superimposed on real space (real images). The processing proceeds to step S403. In the case of providing haptic feedback of a virtual object displayed in a virtual space, the control unit 200 may generate images of the virtual space where the virtual object is located based on the images of real space acquired by the imaging unit 204.

In step S403, the control unit 200 displays the images of the MR space on the display unit 205. The processing proceeds to step S404. In the case of displaying the virtual object in a virtual space, the images of the virtual space may be displayed on the display unit 205.

In step S404, the control unit 200 detects the positions of the user's hands from the captured images obtained by the imaging unit 204, and determines whether the user's hands are gripping the virtual object displayed on the display unit 205. Specifically, the control unit 200 compares the positions of the joint points of the user's hands with the position where the virtual object is located in the coordinate system of the captured images, and determines whether the user is gripping the virtual object. If the control unit 200 determines that the user is gripping the virtual object (YES in step S404), the processing proceeds to step S405. If the user is not determined to be gripping the virtual object (NO in step S404), the processing proceeds to step S413. Whether the user's hands are gripping the virtual object displayed on the display unit 205 may be determined by recognizing the user's hand gesture. For example, if the user makes a pinching gesture, such as bringing the thumb and index finger together, near the virtual object, the user's hand may be determined to be gripping the virtual object displayed on the display unit 205. If a controller is used as a user assist device 110, the virtual object may be determined to be being gripped when a predetermined button on the controller is being pressed. If an operation for gripping the virtual object is determined in advance, whether the virtual object is being gripped may be determined depending on whether the operation for gripping the virtual object is being made.

In step S405, the control unit 200 acquires mass information about the gripped virtual object from the ROM 203, and determines a maximum haptic parameter based on the mass information. The maximum haptic parameter is a parameter for reproducing the mass if the virtual object were placed in real space. The heavier the weight indicated by the mass information about the virtual object, the greater the maximum haptic parameter. The lighter the smaller the maximum haptic parameter.

In step S406, the control unit 200 determines whether the position where the virtual object is gripped, acquired by the imaging unit 204, falls within the haptics-enabled region. If the control unit 200 determines that the position where the virtual object is gripped falls within the haptics-enabled region (YES in step S406), the processing proceeds to step S407. If the position where the virtual object is gripped is determined to fall within the haptics-disabled region (NO in step S406), the processing proceeds to step S408.

Figure 10A:
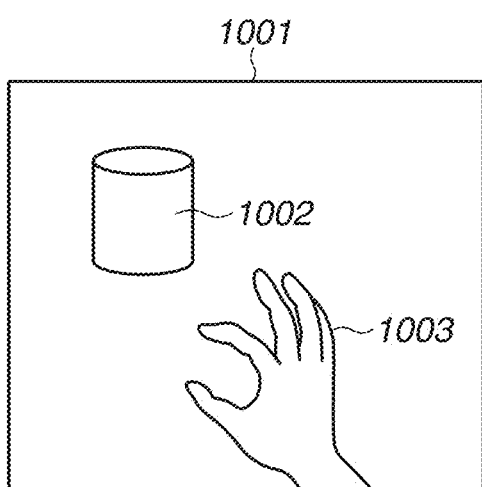
FIG. 10A is a diagram for describing a scene where a virtual object is placed in a mixed reality space according to one or more aspects of the present disclosure.

The position where the virtual object is gripped will now be described with reference to FIGS. 10A, 10B, 10C, and 10D. FIG. 10A illustrates a scene where a virtual object 1002 is located in an MR space 1001. Here, the user's hand 1003 has the index finger and thumb apart and is not making a gripping hand gesture.

Figure 10B:
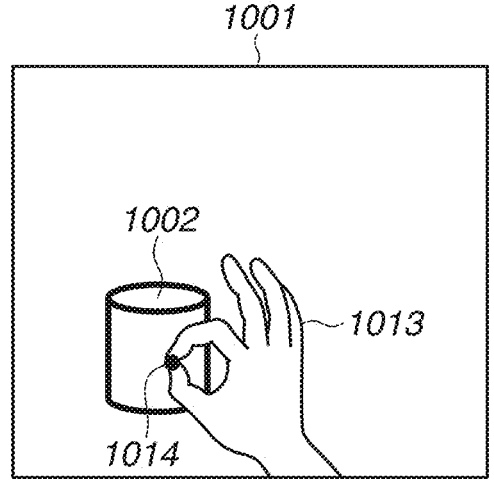
FIG. 10B is a diagram for describing a scene according to one or more aspects of the present disclosure, where the user's hand is directly gripping the virtual object at a position closer to the virtual object in the mixed reality space than in FIG. 10A.

FIG. 10B illustrates a scene where the user's hand 1003 is located at a position 1014 closer to the virtual object 1002 in the MR space 1001 than in FIG. 10A, and directly gripping the virtual object 1002. In this scene, the user's hand 1003 is assumed to be directly gripping the virtual object 101 by making a gesture of bringing the index finger and thumb together. In other words, in the MR space 1001, the user's hand 1003 and the virtual object 1002 contact each other at the position 1014. Here, the position where the virtual object 1002 is gripped is the position 1014.

Figure 10C:
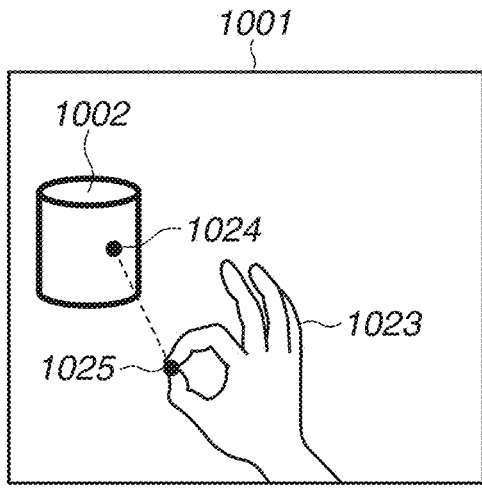
FIG. 10C is a diagram for describing a scene according to one or more aspects of the present disclosure, where the user's hand is indirectly gripping the virtual object by making a gesture at the same position in the mixed reality space as in FIG. 10A.

FIG. 10C illustrates a scene where the user's hand 1023 is located at the same position in the MR space 1001 as in FIG. 10A, and indirectly gripping the virtual object 1002 by making the gesture of bringing the index finger and thumb together. In this state, a position 1024 of the virtual object 1002 is assumed to be selected corresponding to a position 1025 where the index finger and thumb are brought together in the MR space 1001. Here, the position 1025 may be selected as the position where the virtual object 1002 is gripped, instead of the position 1024.

Figure 10D:
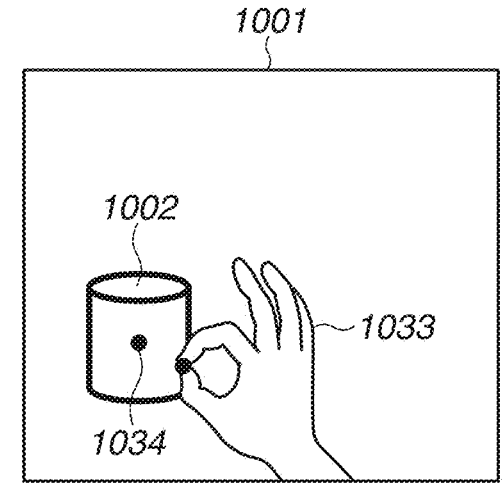
FIG. 10D is a diagram for describing a scene according to one or more aspects of the present disclosure, where the user's hand is gripping the virtual object by making the gesture at a position closer to the virtual object in the mixed reality space than in FIG. 10A.

FIG. 10D illustrates a scene where the user's hand 1033 is located closer to the virtual object 1002 in the MR space 1001 than in FIG. 10A, and gripping the virtual object 1002 by making the gesture of bringing the index finger and thumb together.

Here, the user's hand 1033 and the virtual object 1002 may or may not contact each other in the MR space 1001. In this scene, the position where the VR object 1002 is gripped is assumed to be a position 1034 where the center of gravity (center) of the virtual object 1002 is.

As described above, even when the virtual object is directly gripped by a hand gesture, the position where the virtual object is gripped is not limited to the position where the hand contacts the virtual object. In the case of indirectly gripping the virtual object by a hand gesture, the gripping position may be a predetermined position of the hand or a predetermined position of the virtual object. Alternatively, the position where the virtual object is gripped may be a predetermined coordinate position of the virtual object. Examples include the coordinate position of the center of gravity of the virtual object and the coordinate position of the center of the virtual object. In the case of performing the operation for gripping the virtual object using a controller, the position where the virtual object is gripped may be a selected position of the virtual object or a predetermined position of the virtual object. In the case of performing the operation for gripping the virtual object using a controller, the position where the virtual object is gripped may be a predetermined position of the controller. If a virtual ray is emitted from the controller, the position where the virtual object is gripped may be the point of contact between the ray and the controller.

FIGS. 5B, 5C, 5D, 5E, 6B, 6C, 6D, and 6E illustrate examples of determination of the haptics-enabled and -disabled regions. FIG. 5B is a diagram for describing a scene where the user is gripping the virtual object 501 with one hand and haptics are disabled because the gripping position falls within the haptics-disable region 502. FIG. 5C is a diagram for describing a scene where the user is gripping the virtual object 501 with one hand and haptics are enabled because the gripping position falls within the haptics-enabled region 503. FIG. 5D is a diagram for describing a scene where the user is gripping the virtual object 501 with both hands and haptics are enabled because both the gripping positions fall within the haptics-enabled region 503. FIG. 5E is a diagram for describing a scene where the user is gripping the virtual object 501 with both hands and haptics are disabled because either one of the gripping positions falls within the haptics-disabled region 502.

Figure 6B:
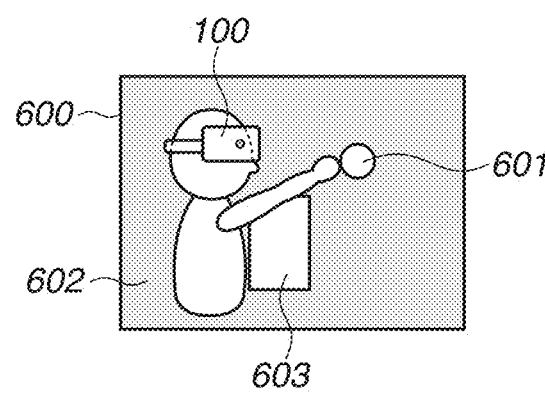
FIG. 6B is a diagram for describing a scene according to one or more aspects of the present disclosure where the user is gripping the virtual object with one hand and haptics are disabled because the gripping position falls within a haptics-disabled region.
Figure 6C:
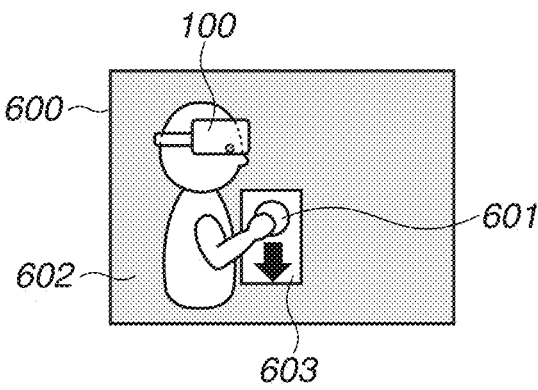
FIG. 6C is a diagram for describing a scene according to one or more aspects of the present disclosure, where the user is gripping the virtual object with one hand and haptics are enabled because the gripping position falls within a haptics-enabled region.
Figure 6D:
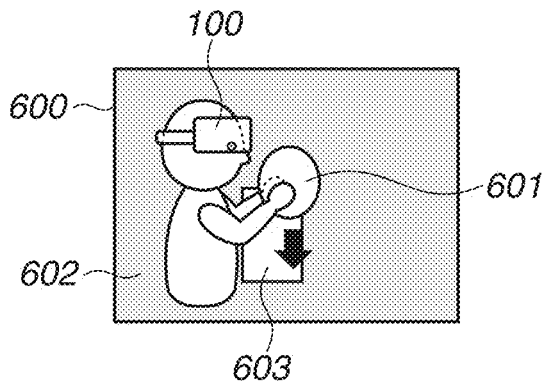
FIG. 6D is a diagram for describing a scene according to one or more aspects of the present disclosure, where the user is gripping the virtual object with both hands and haptics are enabled because both the gripping positions fall within the haptics-enabled region.
Figure 6E:
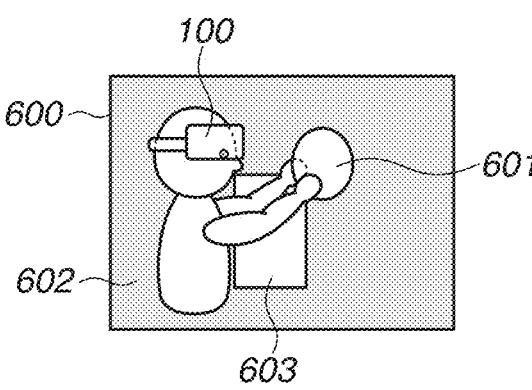
FIG. 6E is a diagram for describing a scene according to one or more aspects of the present disclosure, where the user is gripping the virtual object with both hands and haptics are disabled because one of the gripping positions falls within the haptics-disabled region.

FIG. 6B is a diagram for describing a scene where the user is gripping the virtual object 601 with one hand and haptics are disabled because the gripping position falls within the haptics-disabled region 602. FIG. 6C is a diagram for describing a scene where the user is gripping the virtual object 601 with one hand and haptics are enabled because the gripping position falls within the haptics-enabled region 603. FIG. 6D is a diagram for describing a scene where the user is gripping the virtual object 601 with both hands and haptics are enabled because both the gripping positions fall within the haptics-enabled region 603. FIG. 6E is a diagram for describing a scene where the user is gripping the virtual object 601 with both hands and haptics are disabled because either one of the gripping positions falls within the haptics-disabled region 602.

Figure 7A:
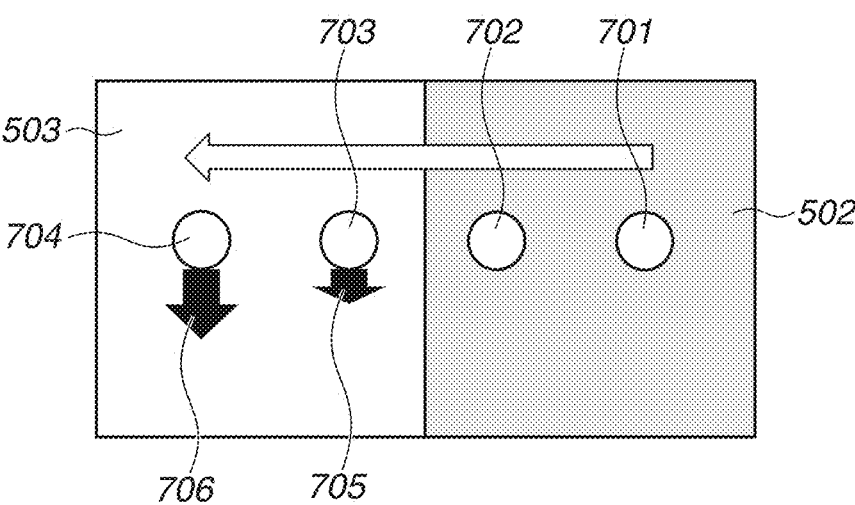
FIG. 7A is a diagram for describing a stepwise increase in a haptic parameter according to the first exemplary embodiment.

In step S407, the control unit 200 acquires the haptic parameter currently presented to the user from the RAM 202, and determines whether the haptic parameter acquired is less than the maximum haptic parameter determined in step S405. If the haptic parameter is less than the maximum haptic parameter (YES in step S407), the processing proceeds to step S409. In step S409, the control unit 200 increases the haptic parameter stepwise. If the haptic parameter is not less than the maximum haptic parameter (NO in step S407), the processing proceeds to step S410. If this control is performed for the first time and there is no current haptic parameter, the current haptic parameter is set to zero. An example of increasing the haptic parameter stepwise will be described with reference to FIG. 7A. In FIG. 7A, the haptics-enabled region 503 and the haptics-disabled region 502 are set up. FIG. 7A illustrates a scene where a virtual object 701 is moved to transition from the haptics-disabled region 502 to the position of a virtual object 702, the position of a virtual object 703, and the position of a virtual object 704 in succession. The position of the virtual object 701 and that of the virtual object 702 fall within the haptics-disabled region 502. The position of the virtual object 703 and that of the virtual object 704 fall within the haptics-enabled region 503. Since the virtual object 701 lies in the haptics-disabled region 502, no haptic parameter is presented when the user grips the virtual object 701. In other words, the haptic parameter is zero. No haptic parameter is presented, either, when the virtual object 701 located in the haptics-disabled region 502 moves to the position of the virtual object 702. Next, when the virtual object 702 located in the haptics-disabled region 502 moves to the position of the virtual object 703 in the haptics-enabled region 503, a first level of haptic parameter 705 is presented. Next, when the virtual object 703 moves to the position of the virtual object 704 in the haptics-enabled region 503, a second level of haptic parameter 706 is presented. Here, the haptic parameter 706 is assumed to be greater than the haptic parameter 705. The haptic parameter may thus be adjusted stepwise depending on the distance. The haptic parameter may be adjusted stepwise depending on time.

In step S409, the control unit 200 increases the haptic parameter by one level, and stores the haptic parameter in the RAM 202. The processing proceeds to step S414.

In step S410, the control unit 200 notifies the user that the maximum haptic parameter is reached. The processing proceeds to step S414. In other words, the control unit 200 issues notification if the generation of the haptic effect up to the maximum haptic parameter is completed. An example of the method for notifying the user that the maximum haptic parameter is reached is to issue notification through vibration via not-illustrated vibration units of the user assist devices 110. The notification is not limited to vibration, and the control unit 200 may notify the user by controlling the display unit 205 to display an indication that the maximum haptic parameter is reached.

In step S408, the control unit 200 acquires the haptic parameter currently presented to the user from the RAM 202, and determines whether the haptic parameter is zero. If the haptic parameter is not zero (NO in step S408), the processing proceeds to step S411. If the haptic parameter is zero (YES in step S408), the processing proceeds to step S412.

In step S411, the control unit 200 decreases the haptic parameter by one level, and stores the haptic parameter in the RAM 202. The processing proceeds to step S414.

Figure 7B:
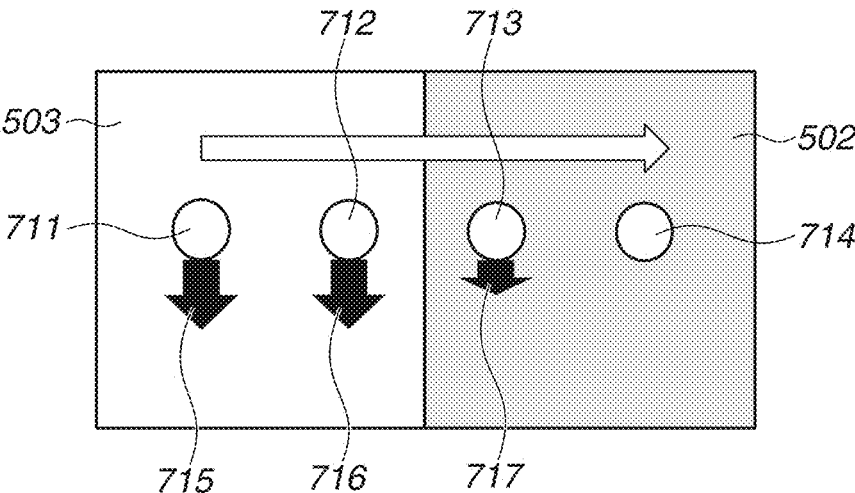
FIG. 7B is a diagram for describing a stepwise decrease in a haptic parameter according to one or more aspects of the present disclosure.

Now, an example of decreasing the haptic parameter stepwise will be described with reference to FIG. 7B. In FIG. 7B, the haptics-enabled region 503 and the haptics-disabled region 502 are set up. FIG. 7B illustrates a scene where a virtual object 711 is moved to transition from the haptics-enabled region 503 to the position of a virtual object 712, the position of a virtual object 713, and the position of a virtual object 714 in succession. Here, the position of the virtual object 711 and that of the virtual object 712 fall within the haptics-enabled region 503. The position of the virtual object 713 and that of the virtual object 714 fall within the haptics-disabled region 502. Since the virtual object 711 lies in the haptics-enabled region 503, a haptic parameter 715 is presented to the user when the user is gripping the virtual object 711. When the virtual object 711 located in the haptics-enabled region 503 moves to the position of the virtual object 712 in the haptics-enabled region 503, a haptic parameter 716 of the same magnitude as that of the haptic parameter 715 is presented. Next, when the virtual object 712 located in the haptics-enabled region 503 moves to the position of the virtual object 713 in the haptics-disabled region 502, a haptic parameter 717 one level lower than the haptic parameter 715 (haptic parameter 716) is presented. Next, when the virtual object 713 moves to the position of the virtual object 714, no haptic parameter is presented. In other words, the haptic parameter is set to zero. The haptic parameter may thus be adjusted stepwise in response to the entry into the haptics-disabled region 502. More specifically, in response to the entry into the haptics-disabled region 502, the haptic parameter having been presented in the haptics-enabled region 503 is decreased stepwise and finally set to zero. The haptic parameter may be adjusted stepwise depending on the distance after the entry into the haptics-disabled region 502. The haptic parameter may be adjusted stepwise depending on time.

In step S412, the control unit 200 sets the haptic parameter to zero, and stores the haptic parameter in the RAM 202. Alternatively, the control unit 200 maintains the haptic parameter of zero stored in the RAM 202. The processing proceeds to step S414.

In step S413, the control unit 200 sets the haptic parameter to zero, and stores the haptic parameter in RAM 202. The processing proceeds to step S414.

In step S414, the control unit 200 notifies the user assist devices 110 of the determined haptic parameter via the communication unit 201. The processing ends. If the haptic parameter is zero, no haptics are presented via the user assist devices 110. If the haptic parameter is not zero, haptics are presented via the user assist devices 110 based on the haptic parameter.

Figure 4:
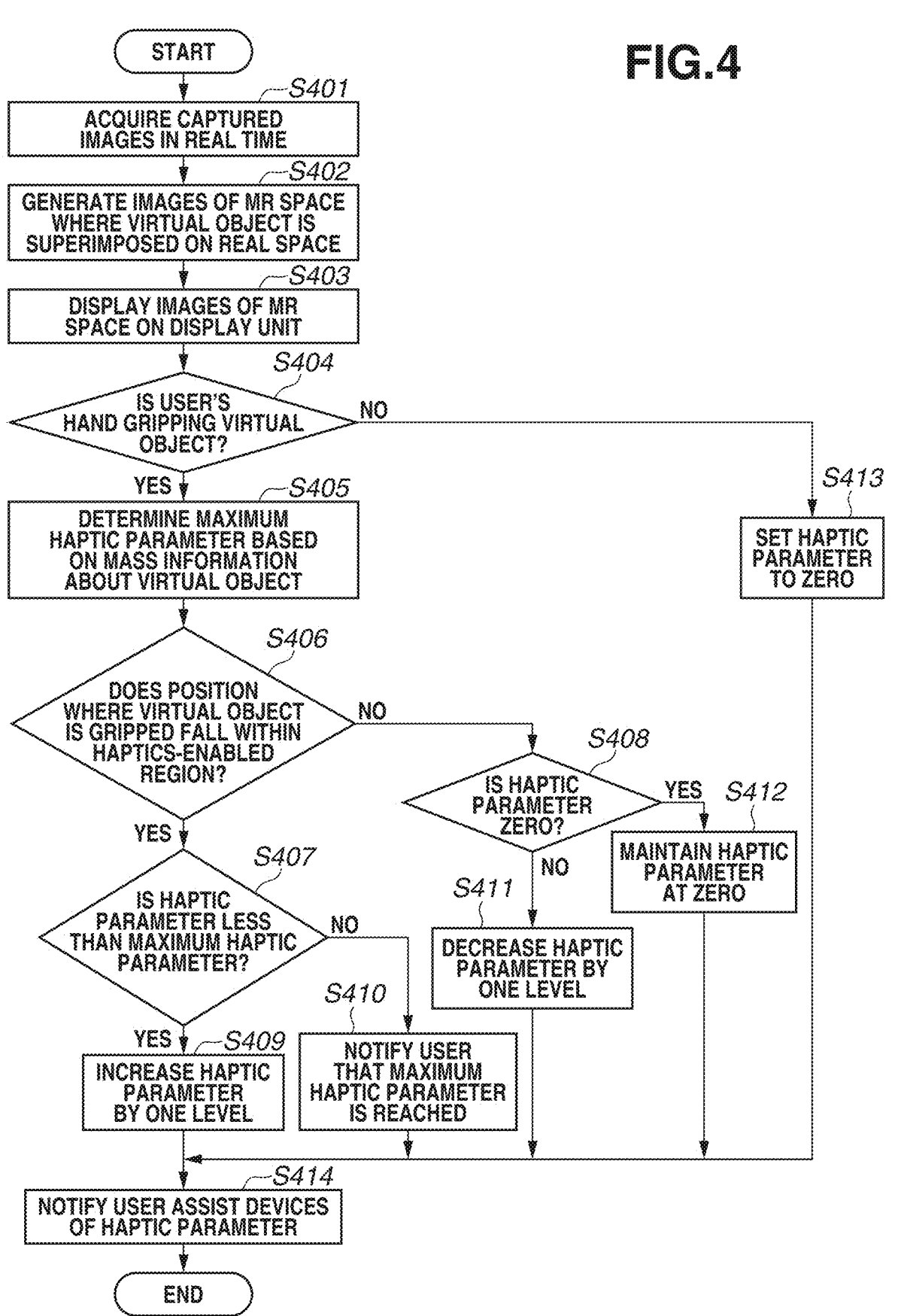
FIG. 4 is a flowchart for describing a processing procedure for providing haptic feedback according to one or more aspects of the present disclosure.

According to the foregoing flowchart of FIG. 4, the magnitude of the haptic parameter can be gradually changed depending on the position where the user's hands are gripping the virtual object in the MR space.

In step S406 of FIG. 4, if the control unit 200 determines that the position where the virtual object is gripped falls within the haptics-enabled region, the haptic parameter may be set to the maximum haptic parameter. In such a case, the control unit 200 stores the set haptic parameter in the RAM 202, and the processing proceeds to step S414.

If, in step S408, the haptic parameter is determined to not be zero, the control unit 200 may set the haptic parameter to zero without decreasing the haptic parameter stepwise.

If the haptic parameter is greater than or equal to a threshold, or less than or equal to a threshold, the haptic parameter may be changed by two levels or more at a time instead of one level.

The provision of the haptic feedback is not limited to that based on the haptics-enabled and -disabled regions set in the MR space. The haptic feedback may be provided based on haptics-enabled and -disabled regions set in a virtual (VR) space or an AR space.

Figure 8:
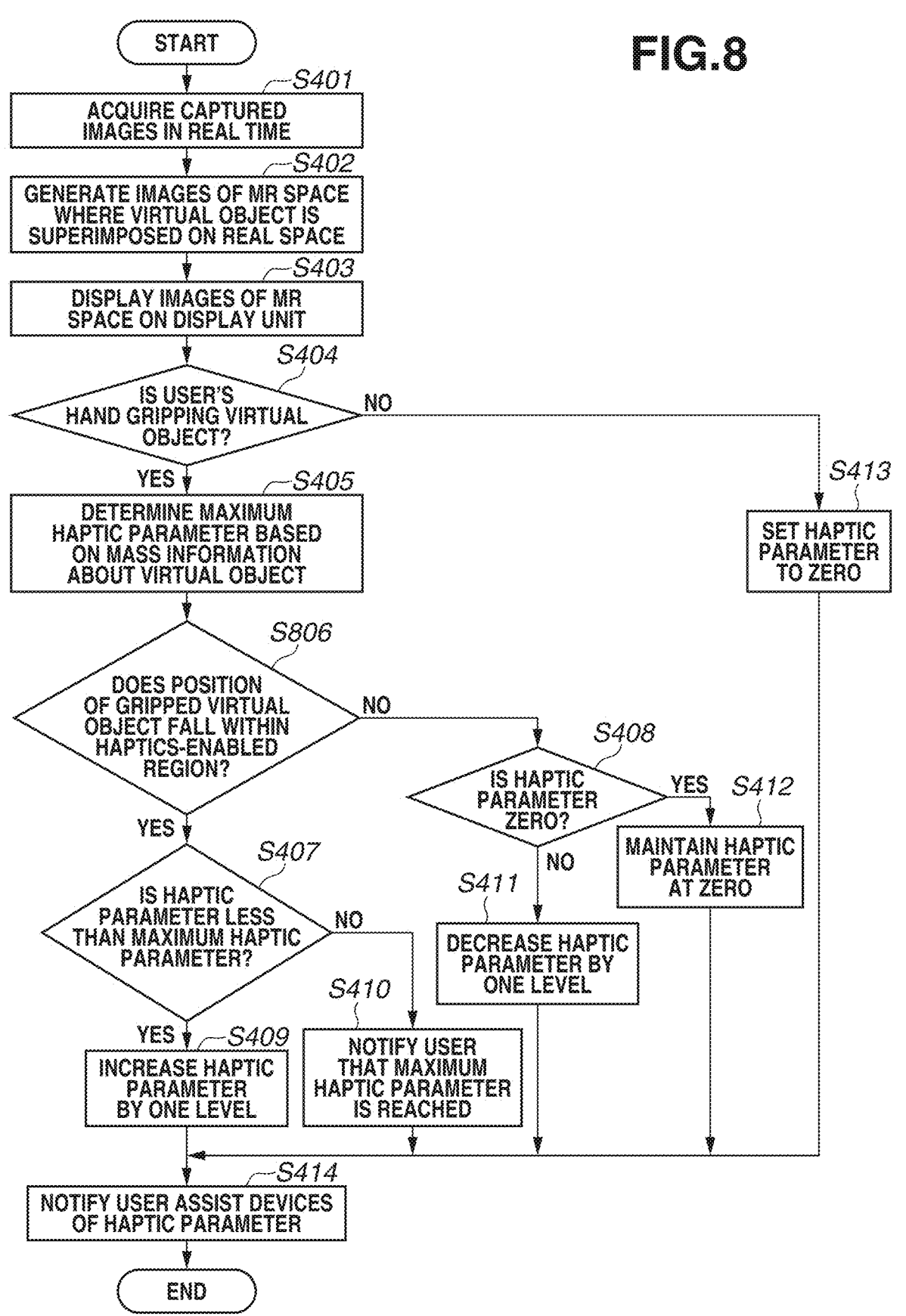
FIG. 8 is a flowchart for describing a processing procedure for providing haptic feedback according to one or more aspects of the present disclosure.

In the first exemplary embodiment, the processing for determining the haptic parameter based on the position where the virtual object is gripped has been described with reference to the flowchart of FIG. 4. A second exemplary embodiment deals with processing for determining the haptic parameter based on the position of the gripped virtual object, instead of the position where the virtual object is gripped. The processing for determining the haptic parameter based on the position of the gripped virtual object according to the second exemplary embodiment of the present disclosure will be described with reference to the flowchart of FIG. 8. This flowchart demonstrates control means according to the present disclosure. This flowchart is started when a virtual object is displayed in a MR space, and repeatedly executed at regular periodic intervals, such as several tens of milliseconds or so, while the virtual object is displayed. In the flowchart of FIG. 8, a description of steps S401 to S405 and S407 to S414, which are redundant with what is described with reference to FIG. 4, will be omitted.

In the flowchart of FIG. 8, in step S806, the control unit 200 determines whether the position of the gripped virtual object falls within the haptics-enabled region. If the control unit 200 determines that the position of the gripped virtual object falls within the haptics-enabled region (YES in step S806), the processing proceeds to step S407. If the position of the gripped virtual object is determined to fall within the haptics-disabled region (NO in step S806), the processing proceeds to step S408.

With reference to FIGS. 9A, 9B, 9C, 9D, and 9E, a description will be given of scenes where whether to enable haptics is determined. FIG. 9A is a diagram for describing a scene where the user wearing the HMD 100 and a virtual object 901 are present in an MR space 900. In this scene, the virtual object 901 is assumed to be placed on the surface of a virtual object 902. With reference to the coordinates of the virtual object 901, a region that agrees with the virtual object 901 is set as a haptics-disabled region 903. A region 904 obtained by excluding the haptics-disabled region 903 from the MR space 900 is set as a haptics-enabled region 904. In other words, the region of the virtual object 901 when the virtual object 901 is located by default is the haptics-disabled region 903. FIG. 9B illustrates a scene where the user wearing the HMD 100 in the MR space 900 grips the virtual object 901. In this scene, the user is assumed to be simply gripping the virtual object 901 without moving it. In other words, the virtual object 901 lies within the haptics-disabled region 903 and is in contact with the surface of the virtual object 902.

FIG. 9C is a diagram for describing a scene where haptics are enabled when a part of the gripped virtual object 901 enters the haptics-enabled region 904. In the scene of FIG. 9C, the user wearing the HMD 100 in the MR space 900 is assumed to be gripping and lifting up the virtual object 901. Being lifted up, the virtual object 901 is separated from the surface of the virtual object 902, and a part of the gripped virtual object 901 enters the haptics-enabled region 904. In other words, in step S806, the control unit 200 determines that the position of the gripped virtual object 901 falls within the haptics-enabled region 904. Here, the position of the gripped virtual object 901 is determined to fall within the haptics-disabled region 903 only if the gripped virtual object 901 is entirely included in the haptics-disabled region 903.

FIGS. 9D and 9E are diagrams for describing scenes where haptics are disabled when a part of the gripped virtual object 901 enters the haptics-disabled region 903, and haptics are enabled when the virtual object 901 is entirely included in the haptics-enabled region 904. In the scene of FIG. 9D, the user wearing the HMD 100 in the MR space 900 is assumed to be gripping and lifting up the virtual object 901. Being lifted up, the virtual object 901 is separated from the surface of the virtual object 902, and a part of the gripped virtual object 901 enters the haptics-enabled region 904. In other words, in step S806, the control unit 200 determines that the position of the gripped virtual object 901 falls within the haptics-disabled region 903. In the scene of FIG. 9E, the user wearing the HMD 100 in the MR space 900 is assumed to be gripping and lifting up the virtual object 901. Unlike FIG. 9D, the virtual object 901 being lifted up is separated from the surface of the virtual object 902 so that the gripped virtual object 901 is entirely included in the haptics-enabled region 904. In other words, in step S806, the control unit 200 determines that the position of the gripped virtual object 901 falls within the haptics-enabled region 904. Here, the position of the gripped virtual object 901 is determined to fall within the haptics-enabled region 904 only if the gripped virtual object 901 is entirely included in the haptics-enabled region 904.

In FIGS. 9A, 9B, 9C, 9D, and 9E, the region of the virtual object 901 when the virtual object 901 is placed is set as the haptics-disabled region 903. In addition, the surface and internal region of the virtual object 902 may also be set as a haptics-disabled region. In such a case, haptic feedback will not be provided if the virtual object 901 is moved to enter the interior of the virtual object 902. This provides the effect of avoiding a loss of immersion.

In FIG. 9A, haptic feedback may be controlled depending on whether the virtual object 901 is in contact with the surface of the virtual object 902. More specifically, haptic feedback may be provided when the virtual object 901 is gripped and separated from the surface of the virtual object 902.

Instead of placing the virtual object 901 on the virtual object 902, the virtual object 901 may be located as if placed on a real object. In such a case, haptic feedback may be provided depending on whether the virtual object 901 is in contact with the surface of the real object. Not only the surface of the real object but the internal region of the real object may also be set as a haptics-disabled region.

As described above, the second exemplary embodiment assumes scenes where whether the virtual object 901 falls within the haptics-enabled region 904 or the haptics-disabled region 903 is determined by taking the area or volume of the virtual object 901 into account. Whether the virtual object 901 falls within the haptics-enabled region 904 or the haptics-disabled region 903 may be determined by taking the area or volume of a real object, such as a controller and the user's hand, into account.

According to the exemplary embodiments described above, haptic feedback control with high operability can be provided during the operations of gripping and releasing a virtual object with mass.

If a plurality of virtual objects is placed, a haptics-disabled region and a haptics-enabled region may be set for each of the virtual objects. More specifically, the haptics-disabled regions for the virtual objects may be set to agree with the regions of the respective virtual objects when placed. Alternatively, if a plurality of virtual objects is placed, a common haptics-disabled region and haptics-enabled region may be set. If a plurality of virtual objects is placed, haptics-disabled regions for the respective virtual objects, haptics-enabled regions for the respective virtual objects, a haptics-disabled region common among the virtual objects, and a haptics-enabled region common among the virtual objects may be freely set.

The provision of haptic feedback is not limited to that based on the haptics-enabled and -disabled regions set in the MR space. Haptic feedback may be provided based on haptics-enabled and -disabled regions set in a virtual (VR) space or an AR space.

Other Exemplary Embodiments

The present disclosure can be implemented by executing the following processing. The processing includes supplying software (program) for implementing the functions of the foregoing exemplary embodiments to a system or a device via a network or various storage media, and reading and executing the program code by a computer (or control unit or microprocessing unit [MPU]) of the system or device. In such a case, the program and the storage media storing the program constitute the present disclosure.

While the exemplary embodiments of the present disclosure have been described in detail, the present disclosure is not limited to these specific exemplary embodiments, and various modifications not departing from the gist of the disclosure are also included in the present disclosure. Some of the foregoing exemplary embodiments may be combined as appropriate.

The functional units of the foregoing exemplary embodiments (modifications) may or may not be respective pieces of hardware. The functions of two or more functional units may be implemented by a common piece of hardware. Two or more functions of a single functional unit may be implemented by respective pieces of hardware. Two or more functions of a single functional unit may be implemented by a common piece of hardware. Each functional unit may or may not be implemented by hardware such as an application-specific integrated circuit (ASIC), a field-programmable gate array (FPGA), and a digital signal processor (DSP). For example, a device may include a processor and a memory (storage medium) storing a control program. The functions of at least some of the functional units included in the device may be implemented by the processor reading the control program from the memory and executing the control program.

The present disclosure can also be implemented by processing for supplying a program for implementing one or more functions of the foregoing exemplary embodiments to a system or a device via a network or a storage medium, and reading and executing the program by one or more processors in a computer of the system or device. A circuit for implementing one or more functions (for example, ASIC) may be used for implementation.

In the exemplary embodiments described above, a processor refers to a processor in a broad sense, including general-purpose processors (such as a CPU) and dedicated processors (such as a GPU, ASIC, FPGA, and programmable logic device).

According to the present disclosure, a technique can be provided that performs haptic feedback control with high user operability when a user operates a virtual object.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-103357, filed Jun. 26, 2024, which is hereby incorporated by reference herein in its entirety.

What is claimed is:

1. An information processing device comprising:
a processor; and
a memory storing a program which, when executed by the processor, causes the information processing device to:
execute acquisition processing to acquire information about a physical characteristic of a virtual object;
execute setting processing to set a first region and a second region different from the first region in a space where the virtual object is located; and
execute control processing to, in a case where a position of the virtual object held by a user falls within the first region in the space, not control generation of a haptic effect based on the information, and in a case where the position falls within the second region, control the generation of the haptic effect.

2. The information processing device according to claim 1, wherein the control processing includes, in a case where at least a part of the virtual object enters the second region, generating the haptic effect based on the information.

3. The information processing device according to claim 1, wherein the control processing includes, in a case where at least a part of the virtual object enters the second region, gradually generating the haptic effect based on the information over a predetermined time.

4. The information processing device according to claim 3, wherein the control processing includes, in a case where a first haptic effect related to weight is generated based on the information, generating the haptic effect so that the weight increases gradually over a predetermined time.

5. The information processing device according to claim 3, wherein the program, when executed by the processor, further causes the information processing device to execute information acquisition processing to, in a case where the generation of the haptic effect based on the information is completed, notify the user that the generation of the haptic effect is completed.

6. The information processing device according to claim 1, wherein the control processing includes, in a case where a position where the virtual object is gripped falls within the first region, not generating the haptic effect based on the information, and in a case where the position where the virtual object is gripped falls within the second region different from the first region, generating the haptic effect.

7. The information processing device according to claim 6, wherein the position where the virtual object is gripped is a position serving as a point of contact between the virtual object and a hand of the user, a predetermined position of the virtual object, or a predetermined position of the hand of the user.

8. The information processing device according to claim 1, wherein the control processing includes, in a case where a first virtual object is placed on a second virtual object or a real object and the user grips the first virtual object and separates the first virtual object from a surface of the second virtual object or the real object, generating the haptic effect based on the information.

9. The information processing device according to claim 1, wherein the first region is a region where the virtual object is located by default.

10. The information processing device according to claim 1, wherein the first region is set for each virtual object.

11. The information processing device according to claim 1, wherein the second region is a region within a predetermined distance from a torso of the user.

12. The information processing device according to claim 1, wherein the second region is a region within a predetermined distance from a display device.

13. The information processing device according to claim 1, wherein the physical characteristic includes at least one of a size, shape, rigidity, weight, thermal characteristic, and texture of the virtual object.

14. The information processing device according to claim 1, wherein the program, when executed by the processor, further causes the information processing device to execute information acquisition processing to transmit the haptic effect generated by the control processing to an actuator.

15. The information processing device according to claim 1, wherein the program, when executed by the processor, further causes the information processing device to execute display control processing to control identifiable display of the first region and the second region on a display.

16. The information processing device according to claim 15, wherein the display control processing includes displaying a border between the first region and the second region on the display.

17. The information processing device according to claim 15, wherein the display control processing includes displaying the first region and the second region in different colors on the display.

18. A control method of an information processing device, comprising:
  acquiring information about a physical characteristic of a virtual object;
  setting a first region and a second region different from the first region in a space where the virtual object is located; and
  in a case where a position of the virtual object held by a user falls within the first region in the space, not controlling generation of a haptic effect based on the information, and in a case where the position falls within the second region, controlling the generation of the haptic effect.

19. A non-transitory computer readable medium that stores a program, wherein the program causes a computer to execute a control method according to claim 18.

20. An information processing system comprising:
  an acquisition device configured to acquire information about a physical characteristic of a virtual object;
  a setting device configured to set a first region and a second region different from the first region in a space where the virtual object is located; and
  a control device configured to, in a case where a position of the virtual object held by a user falls within the first region in the space, not control generation of a haptic effect based on the information, and in a case where the position falls within the second region, control the generation of the haptic effect.

* * * * *